(12) United States Patent
Kondo et al.

(10) Patent No.: US 11,817,261 B2
(45) Date of Patent: Nov. 14, 2023

(54) ELECTRODE MATERIAL FOR CAPACITOR COMPRISING BORON-DOPED NANODIAMOND

(71) Applicants: DAICEL CORPORATION, Osaka (JP); TOKYO UNIVERSITY OF SCIENCE FOUNDATION, Tokyo (JP)

(72) Inventors: Takeshi Kondo, Tokyo (JP); Tatsuo Aikawa, Tokyo (JP); Makoto Yuasa, Tokyo (JP); Kenjo Miyashita, Tokyo (JP); Masahiro Nishikawa, Tokyo (JP); Takahiro Tei, Tokyo (JP)

(73) Assignees: DAICEL CORPORATION, Osaka (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 16 days.

(21) Appl. No.: 17/529,754

(22) Filed: Nov. 18, 2021

(65) Prior Publication Data

US 2022/0076899 A1 Mar. 10, 2022

Related U.S. Application Data

(63) Continuation of application No. 16/764,775, filed as application No. PCT/JP2018/032517 on Aug. 28, 2018, now abandoned.

(30) Foreign Application Priority Data

Nov. 16, 2017 (JP) ................................ 2017-220842

(51) Int. Cl.
*C25B 11/04* (2021.01)
*H01G 11/32* (2013.01)
(Continued)

(52) U.S. Cl.
CPC ............. *H01G 11/32* (2013.01); *C01B 32/28* (2017.08); *H01G 11/86* (2013.01);
(Continued)

(58) Field of Classification Search
CPC ...................................................... C25B 11/04
See application file for complete search history.

(56) References Cited

U.S. PATENT DOCUMENTS

2006/0175953 A1  8/2006  Swain et al.
2015/0102266 A1  4/2015  Bitziou et al.
(Continued)

FOREIGN PATENT DOCUMENTS

EP    3 067 324 A1    9/2016
JP    2008-133173 A   6/2008
(Continued)

OTHER PUBLICATIONS

Ay et al., "The Physicochemical and Electrochemical Properties of 100 and 500 nm Diameter Diamond Powders Coated with Boron-Doped Nanocrystalline Diamond," Journal of The Electrochemical Society, vol. 155, No. 10, 2008, 10 pages total.
(Continued)

*Primary Examiner* — Hoa (Holly) Le
(74) *Attorney, Agent, or Firm* — Birch, Stewart, Kolasch & Birch, LLP

(57) ABSTRACT

An ink includes a boron-doped nanodiamond having a specific surface area of 110 m²/g or greater, and electrical conductivity at 20° C. of $5.0 \times 10^{-3}$ S/cm or greater.

25 Claims, 12 Drawing Sheets

(51) Int. Cl.
  *C01B 32/28* (2017.01)
  *H01G 11/86* (2013.01)
(52) U.S. Cl.
  CPC ...... *C01P 2002/54* (2013.01); *C01P 2002/82* (2013.01); *C01P 2004/04* (2013.01); *C01P 2004/62* (2013.01); *C01P 2006/12* (2013.01); *C01P 2006/40* (2013.01)

(56) References Cited

U.S. PATENT DOCUMENTS

| | | | | |
|---|---|---|---|---|
| 2015/0233010 A1* | 8/2015 | Pan | ...................... | H01M 4/0428 216/13 |
| 2023/0183102 A1* | 6/2023 | Wei | ...................... | C25B 11/083 205/759 |

FOREIGN PATENT DOCUMENTS

| | | |
|---|---|---|
| JP | 2013-76130 A | 4/2013 |
| JP | 2015-174793 A | 10/2015 |

OTHER PUBLICATIONS

Extended European Search Report for European Application No. 18878087.8, dated Jul. 16, 2021.
Hanssen et al., "Recent strategies to minimise fouling in electrochemical detection systems," Reviews in Analytical Chemistry, vol. 35, No. 1, 2016, pp. 1-28.
International Search Report, dated Dec. 4, 2018, for International Application No. PCT/JP2018/032517, with an English translation.
Nakajima et al., "Fabrication and characterization of conductive diamond powder of various particle sizes," Lecture abstracts of the 82nd conference of the Electrochemical Society of Japan, Fac. of Sci. and Technol., Tokyo Univ. of Sci., 2015, p. 1004.
Shakhov et al., "Boron doped diamond synthesized from detonation nanodiamond in a C—O—H fluid at high pressure and high temperature," Journal of Solid State Chemistry, 2017, vol. 256, pp. 72-92 ( 21 pages).
Written Opinion of the International Searching Authority, dated Dec. 4, 2018, for International Application No. PCT/JP2018/032517, with an English translation.
Japanese Office Action for Japanese Application No. 2019-553707, dated Jul. 26, 2022.

* cited by examiner

ELECTRODE MATERIAL FOR CAPACITOR COMPRISING BORON-DOPED NANODIAMOND

CROSS-REFERENCE TO RELATED APPLICATIONS

This application is a Continuation of application Ser. No. 16/764,775 filed on May 15, 2020, which is a National Phase of PCT International Application No. PCT/JP2018/032517 filed on Aug. 28, 2018, which claims priority under 35 U.S.C. § 119(a) to Patent Application No. 2017-220842 filed in Japan on Nov. 16, 2017. All of the above applications are hereby expressly incorporated by reference into the present application.

TECHNICAL FIELD

The present invention relates to a boron-doped nanodiamond useful as an electrode material for a capacitor, etc., an electrode containing the boron-doped nanodiamond, and a sensor or electricity storage device provided with the electrode. Note that application of the boron-doped nanodiamond of the present invention is not limited to an electrode material for a capacitor. The present application claims the rights of priority of JP 2017-220842 filed in Japan on 16 Nov. 2017, the content of which is incorporated herein.

BACKGROUND ART

It is known that when boron is doped at a high concentration in a diamond, which is an insulator, holes are created (p-type semiconductors) and metallic conductivity is imparted. Furthermore, boron-doped diamond (BDD), in which diamond is doped with a high concentration of boron, exhibits high physical and chemical stability originating from the diamond, and also exhibits excellent conductivity. In addition, electrodes that contain boron-doped diamond have a wide electrochemical window (electrical potential range in which electrolysis of water does not occur) and a small background current, and therefore boron-doped diamond is attracting attention as a functional electrode material that can be effectively employed in electrochemical analysis or electrolysis as compared to electrode materials such as precious metals or carbon.

As a method for manufacturing boron-doped diamond, for example, Patent Document 1 discloses a method in which a mixture of boron, diamond particles, and an alkaline earth carbonate powder is heated at a temperature of from 1300 to 1800° C. under pressurization from 5.0 to 8.0 GPa to thereby dope the diamond particles with boron, and produce boron-doped diamond particles. However, the average particle size of the boron-doped diamond particles of Patent Document 1 is from 1 to 8 μm, the specific surface area is small, and it is difficult to ensure sufficient capacitance for use as an electrode for an electricity storage device.

In addition, Patent Document 2 describes that when boron and nanodiamond particles are heated at a temperature of from 700 to 1000° C. in a hydrogen atmosphere, boron-doped nanodiamond having a large specific surface area is obtained. However, the boron-doped nanodiamond obtained by this method is still insufficient in terms of electrical conductivity.

CITATION LIST

Patent Document

Patent Document 1: JP 2008-133173 A
Patent Document 2: JP 2015-174793 A

SUMMARY OF INVENTION

Technical Problem

Therefore, an object of the present invention is to provide boron-doped nanodiamond (hereinafter, may be referred to as "BDND") having a large specific surface area and high electrical conductivity.

Another object of the present invention is to provide an electrode containing the BDND.

Yet another object of the present invention is to provide a sensor provided with the electrode.

Yet another object of the present invention is to provide an electricity storage device provided with the electrode.

Solution to Problem

As a result of diligent research to solve the above problems, the present inventors discovered that BDND produced by forming a boron-containing diamond layer and/or carbon layer by chemical vapor deposition (CVD method) on the surface of nanodiamond particles has a large specific surface area and high electrical conductivity, and when the BDND is used in an electrode, an electrode having large capacitance can be obtained. The present invention was completed based on these findings.

That is, the present invention provides a boron-doped nanodiamond having a specific surface area of 110 m$^2$/g or greater, and electrical conductivity at 20° C. of 5.0×10$^{-3}$ S/cm or greater.

The present invention also provides the boron-doped nanodiamond having a median diameter of 200 nm or smaller.

The present invention also provides the boron-doped nanodiamond having bands at from 1370 to 1420 cm$^{-1}$ and from 1580 to 1620 cm$^{-1}$ in a Raman spectrum with a light source wavelength of 325 nm.

The present invention also provides an electrode containing the boron-doped nanodiamond.

The present invention also provides the electrode having an electrical double-layer capacitance per mass of 3 F/g or greater.

The present invention also provides a sensor provided with the electrode.

The present invention also provides an electricity storage device provided with the electrode.

Advantageous Effects of Invention

The BDND according to an embodiment of the present invention exhibits high physical stability and chemical stability originating from the diamond, and also has excellent conductivity and a large specific surface area. Therefore, if the BDND according to an embodiment of the present invention is used, an electrode with large capacitance can be obtained.

In addition, an electrode containing the BDND according to an embodiment of the present invention exhibits high sensitivity, and the electrical double-layer capacitance per mass is large. In other words, the capacitance is large. The electrode thereof also has a wide electrochemical window. Therefore, the electrode is useful as an electrode for an electrochemical sensor or an electricity storage device.

DESCRIPTION OF EMBODIMENTS

BDND

Figure 1:
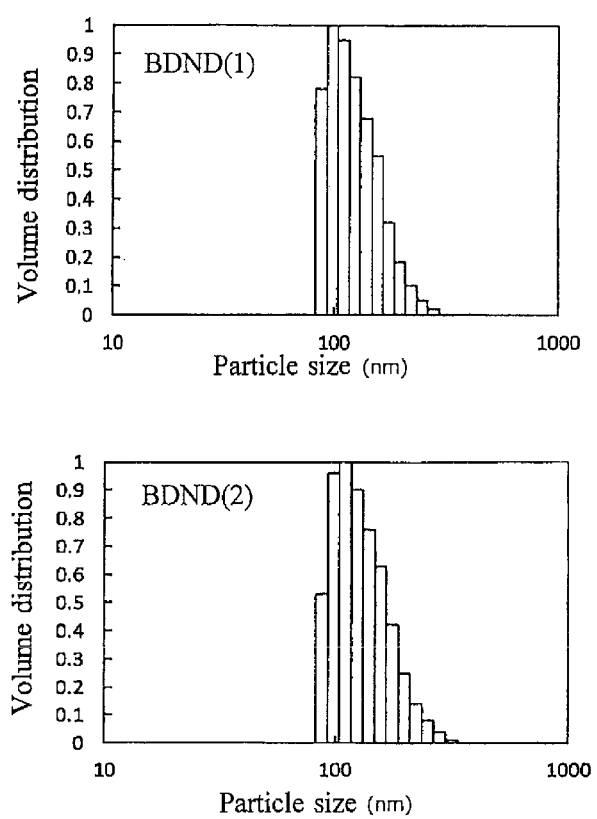
FIG. 1 shows particle size measurement results for a BDND (1) and a BDND (2) produced in the examples, the particle size being measured by a dynamic light scattering method.

The BDND according to an embodiment of the present invention has a specific surface area of 110 m²/g or greater and an electrical conductivity at 20° C. of $5.0 \times 10^{-3}$ S/cm or greater.

The BDND according to an embodiment of the present invention contains boron on the surface of nanodiamond particles (ND particles). The BDND according to an embodiment of the present invention preferably has a configuration in which a boron-containing diamond layer and/or carbon layer is deposited on the surface of the ND particles.

The specific surface area of the BDND according to an embodiment of the present invention is 110 m²/g or greater, preferably 150 m²/g or greater, more preferably 200 m²/g or greater, even more preferably 300 m²/g or greater, even more preferably 400 m²/g or greater, particularly preferably 500 m²/g or greater, and most preferably 600 m²/g or greater. The upper limit of the specific surface area is, for example, 1500 m²/g.

The electrical conductivity at 20° C. of the BDND according to an embodiment of the present invention is $5.0 \times 10^{-3}$ S/cm or greater, preferably $10 \times 10^{-3}$ S/cm or greater, more preferably $15 \times 10^{-3}$ S/cm or greater, even more preferably $20 \times 10^{-3}$ S/cm or greater, particularly preferably $25 \times 10^{-3}$ S/cm or greater, and most preferably $30 \times 10^{-3}$ S/cm or greater. The upper limit of the electrical conductivity at 20° C. is, for example, approximately 1000 S/cm.

The boron content in the BDND according to an embodiment of the present invention is, for example, from 0.1 to 100 mg/g, preferably from 0.2 to 50 mg/g, particularly preferably from 0.3 to 10 mg/g, most preferably from 0.4 to 5 mg/g, and above all, most preferably from 0.5 to 2 mg/g. When the BDND according to an embodiment of the present invention contains boron in the range described above, the BDND can exhibit excellent conductivity.

The particle size (D50, median diameter) of the BDND according to an embodiment of the present invention is, for example, 200 nm or smaller, preferably 150 nm or smaller, and particularly preferably 120 nm or smaller. The lower limit of the particle size of the BDND is, for example, 1 nm. When the particle size exceeds the range above, the specific surface area id reduced, and the capacitance of the electrode containing the BDND tends to be reduced. The particle size of the BDND can be measured using a dynamic light scattering method.

The BDND according to an embodiment of the present invention has bands at from 1370 to 1420 cm⁻¹ and from 1580 to 1620 cm⁻¹ in a Raman spectrum with a light source wavelength of 325 nm.

The BDND according to an embodiment of the present invention can be manufactured, for example, by a Chemical Vapor Deposition (CVD) method such as a thermal CVD method, a plasma CVD method, a light CVD method, and a laser CVD method. More specifically, in the presence of a carrier gas (for example, hydrogen gas or nitrogen gas) as necessary, film forming materials (a boron source and a carbon source) in a vaporized state are subjected to energy such as heat, plasma, ultraviolet light, or laser light to induce and promote a chemical reaction, and boron is deposited on the surface of ND particles as a base material (or the boron-containing diamond layer and/or carbon layer is deposited on the surface) to produce the BDND. In the present invention, of these CVD methods, it is preferable to use a plasma CVD method (in particular, a microwave plasma CVD method) because high quality BDND can be obtained with little impurities.

Boron or boron compounds can be used as the boron source. Examples of the boron compounds include boron oxide, boron carbide, boron nitride, boric acid, diborane, triethylborane, trimethoxyborane, triethoxyborane, tripropoxyborane, and tri(1,1-dimethylethoxy)borane. One type of these can used alone or two or more types can be used in combination.

Examples of the carbon source include aliphatic hydrocarbons such as methane, ethane, propane, butane, pentane, hexane, heptane, and octane; alicyclic hydrocarbons such as cyclohexane; aromatic hydrocarbons such as benzene, toluene, xylene, and ethylbenzene; alcohols such as methanol, ethanol, isopropyl alcohol, and butanol; ketones such as acetone, methyl ethyl ketone, and methyl isobutyl ketone;

ethers such as diethyl ether, dimethoxyethane, tetrahydrofuran, and dioxane; and esters such as methyl acetate, ethyl acetate, isopropyl acetate, and butyl acetate. One type of these can used alone or two or more types can be used in combination.

As the carbon source, use of a mixture of a ketone and an alcohol (for example, a mixed solution of acetone and methanol) is preferable from the perspective of ease of vaporization and excellent solubility of the boron source. The mixing ratio (v/v) of ketone and alcohol is, for example, from 95/5 to 60/40.

The concentration of the boron source included in the film forming material is, for example, from 10000 to 30000 ppm, and preferably from 15000 to 25000 ppm, relative to the carbon source. When the concentration of the boron source exceeds the above range, the crystallinity of the diamond layer and/or carbon layer tends to deteriorate. On the other hand, when the concentration of the boron source falls below the range described above, conductivity is less likely to be obtained.

The pressure when carrying out the CVD method is, for example, from 30 to 80 Torr.

The CVD treatment time (or film forming time) is, for example, from 1 to 24 hours, and preferably from 5 to 12 hours.

After boron has been doped onto the surface of the ND particles by the CVD method (more specifically, after the boron-containing diamond layer and/or carbon layer has been grown on the surface of the ND particles), the produced BDND is subjected to a heating treatment and the structure of the diamond layer and/or carbon layer included in the BDND is optimized. This is preferable from the perspective that the specific surface area of the BDND can be dramatically increased, and the electrical double-layer capacitance of the electrode including the BDND can be increased.

The heating temperature in the heating treatment is, for example, from 400 to 600° C., and preferably from 400 to 500° C. The heating time is, for example, from 1 to 24 hours, and preferably from 5 to 12 hours.

The particle size (D50, median diameter) of the ND particles as a base material is, for example, 50 nm or smaller, preferably 30 nm or smaller, particularly preferably 20 nm or smaller, and most preferably 10 nm or smaller. The lower limit of the particle size of the ND particles as the base material is, for example, 1 nm.

As the ND particles used as base material, for example, detonation ND (i.e., ND generated by a detonation method) or high-temperature high-pressure ND (i.e., ND produced by a high-temperature high-pressure method) can be used. In an embodiment of the present invention, of the ND particles, detonation ND are preferable in that the specific surface area is greater.

An example of the method for manufacturing ND particles is described below; however, in an embodiment of the present invention, the ND particles are not limited to those obtained by the following manufacturing method.

Formation

First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 m³. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is ignited, and the explosive is detonated in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce NDs by the action of the pressure and energy of the shock waves that are produced in the explosion. Due to Coulomb interaction between crystal planes, in addition to van der Waals forces between adjacent primary particles or crystallites, the produced NDs aggregate very firmly to form aggregates.

In the formation, next, the vessel and its interior are left to stand for approximately 24 hours at room temperature, thereby allowed to be cooled. After the cooling, the ND crude product (containing the aggregate of the ND particles formed as described above and soot), which adheres to the inner wall of the vessel, is scraped with a spatula, and the ND crude product is thereby collected. The crude product of ND particles can be formed by the method described above.

Oxidization Treatment

The oxidation treatment is a process to remove graphite from the ND crude product using an oxidizing agent. The ND crude product formed by the detonation method includes graphite, and this graphite is derived from carbon that did not form ND crystals, among the carbons released by partially incomplete combustion of the explosive used. The graphite can be removed from the ND crude product by allowing a predetermined oxidizing agent to act thereon in an aqueous solvent. Furthermore, by allowing the oxidizing agent to act thereon, an oxygen-containing group, such as a carboxyl group and a hydroxy group, can be introduced onto the ND surface.

Examples of the oxidizing agent used in the oxidation treatment include chromic acid, chromic anhydride, dichromic acid, permanganic acid, perchloric acid, nitric acid, mixtures of these, mixed acids of at least one type of acid selected from these and another acid (e.g. sulfuric acid), and salts of these. In an embodiment of the present invention, among these oxidizing agents, use of a mixed acid (especially, a mixed acid of sulfuric acid and nitric acid) is preferred from the viewpoint of environmental friendliness and excellent action of oxidizing and removing the graphite.

The mixture ratio of sulfuric acid to nitric acid (the former/the latter, mass ratio) in the above-described mixed acid is preferably, for example, from 60/40 to 95/5, since when the mixture ratio is in that range, it is possible to efficiently oxidize and remove graphite at, for example, a temperature of 130° C. or higher (particularly preferably 150° C. or higher, and the upper limit being 200° C., for example), even under approximately atmospheric pressure (for example, 0.5 to 2 atm). The lower limit is preferably 65/35, and particularly preferably 70/30. Furthermore, the upper limit is preferably 90/10, particularly preferably 85/15, and most preferably 80/20.

When the proportion of the nitric acid in the mixed acid is greater than the range described above, the content of the sulfuric acid having a high boiling point becomes smaller. Therefore, at a pressure near atmospheric pressure, the reaction temperature is, for example, 120° C. or lower, and the efficiency of graphite removal tends to decrease. On the other hand, when the proportion of the nitric acid in the mixed acid is less than the range described above, the efficiency of graphite removal tends to decrease because it is the nitric acid that contributes significantly to the oxidation of the graphite.

The usage amount of the oxidizing agent (especially, the mixed acid) is, for example, from 10 to 50 parts by mass, preferably from 15 to 40 parts by mass, and particularly preferably from 20 to 40 parts by mass, relative to 1 part by mass of the ND crude product. Furthermore, the usage amount of the sulfuric acid in the mixed acid is, for example, from 5 to 48 parts by mass, preferably from 10 to 35 parts by mass, and particularly preferably from 15 to 30 parts by mass, relative to 1 part by mass of the ND crude product, and the usage amount of the nitric acid in the mixed acid is, for example, from 2 to 20 parts by mass, preferably from 4 to 10 parts by mass, and particularly preferably from 5 to 8 parts by mass, relative to 1 part by mass of the ND crude product.

Furthermore, when the mixed acid is used as the oxidizing agent, a catalyst may be used together with the mixed acid. The use of a catalyst can further enhance the efficiency of graphite removal. Examples of the catalyst include copper (II) carbonate. The amount of the catalyst used is, for example, approximately from 0.01 to 10 parts by mass per 100 parts by mass of the ND crude product.

The oxidation treatment temperature is, for example, from 100 to 200° C. The duration of the oxidation treatment is, for example, from 1 to 24 hours. The oxidation treatment can be performed under reduced pressure, under atmospheric pressure, or under increased pressure.

After such oxidation treatment, it is preferable to remove the supernatant by decantation, for example. In addition, in decantation, the solid content is preferably washed with water. The supernatant liquid from the initial washing with water is colored, and thus, preferably, the solid content is preferably repeatedly washed with water until the supernatant liquid turns visually transparent.

Furthermore, the ND particles after oxidation treatment may be subjected to an oxidation treatment or reduction treatment in a gas phase as necessary. By performing an oxidation treatment in the gas phase, ND particles having a large amount of C=O groups on the surface are obtained. In addition, by carrying out a reduction treatment in the gas phase, ND particles having a large amount of C—H groups on the surface are produced.

Further, the ND particles after the oxidation treatment may be subjected to a crushing treatment as necessary. The crushing treatment can be performed using, for example, a high shearing mixer, a high shear mixer, a homomixer, a ball mill, a bead mill, a high pressure homogenizer, an ultrasonic homogenizer, or a colloid mill. Note that the crushing treatment may be performed by a wet process (for example, a crushing treatment in a state of being suspended in water or the like) or may be performed by a dry process. When the crushing treatment is performed by a dry process, it is preferable to provide a drying step before the crushing treatment.

Drying

In the present method, next, dying is preferably performed. For example, after a liquid component is vaporized from the ND-containing solution formed by the process described above, by using a spray dryer, an evaporator, or the like, the resulting residual solid component was dried by heating in an oven for drying. The temperature for heat drying is, for example, from 40 to 150° C. Through such drying, ND particles are obtained.

Electrode

An electrode according to an embodiment of the present invention includes, for example, the BDND described above as conductive particles. The BDND described above has a wide electrochemical window, has high physical stability and chemical stability originating from the diamond, and also exhibits excellent conductivity. In addition, the specific surface area is large. Thus, the electrode including the BDND has high capacitance.

The electrode according to an embodiment of the present invention has a high capacitance, and the electrical double-layer capacitance per mass of the electrode according to an embodiment of the present invention is, for example, not less than 3 F/g, preferably not less than 5 F/g, particularly preferably not less than 8 F/g, most preferably not less than 10 F/g, and above all, most preferably not less than 12 F/g. Note that the upper limit of the electrical double-layer capacitance per mass is, for example, approximately 20 F/g.

The electrode according to an embodiment of the present invention can be manufactured, for example, by coating or impregnating a base member with an ink containing BDND, and then fixing the BDND with a binder or the like.

An insulating substrate or a conductive substrate can be used as the base member. Examples of the insulating substrate include silicon substrates, glass substrates, quartz substrates, ceramic substrates, and diamond substrates. Examples of the conductive substrate include metal substrates such as titanium, molybdenum, niobium, aluminum, and stainless steel, and carbon material substrates such as glassy carbon.

As an ink containing BDND, for example, a BDND dispersion solution in which the BDND described above is dispersed in a dispersion medium (for example, an alcohol such as ethanol) can be used. The BDND concentration in the ink is, for example, preferably 20 mass % or greater, and more preferably from 20 to 50 mass %.

When dispersing the BDND in the dispersion medium, the BDND is preferably highly dispersed in the dispersion medium using, for example, a high shearing mixer, a high shear mixer, a homomixer, a ball mill, a bead mill, a high pressure homogenizer, an ultrasonic homogenizer, or a colloid mill. The crushing treatment is preferably performed until the particle size (D50, median diameter) of the BDND in the ink is, for example, from 50 to 200 nm (preferably from 50 to 150 nm, particularly preferably from 50 to 120 nm).

After the base member is coated or impregnated with the ink containing the BDND, a drying treatment is preferably performed to evaporate the dispersion medium.

Examples of the binder include polymeric compounds having high proton conductivity (particularly polymeric compounds having a sulfonic acid group), and commercially available products such as product of the trade name "Nafion" (available from SIGMA-ALDRICH) can be used.

The usage amount of the binder is, for example, approximately from 0.1 to 5 parts by mass, and preferably from 0.5 to 2 parts by mass, per one part by mass of the BDND.

The electrode according to an embodiment of the present invention has a large electrical double-layer capacitance, and therefore can be suitably used as an electrode for an electricity storage device such as an electrical double-layer capacitor (EDLC). In addition, since an electrode according to an embodiment of the present invention has a wide electrochemical window and a small background current, trace signals like those that are hidden by noise with metal electrodes can also be analyzed, and thus an electrode according to an embodiment of the present invention may also be used in sensors for micro-measurements in fields such as environmental analysis, clinical testing, and food inspections, for example.

Electricity Storage Device

An electricity storage device according to an embodiment of the present invention includes the BDND electrode described above. Electricity storage devices include an electrical double-layer capacitor, a hybrid capacitor (in particular, a lithium ion capacitor) and the like.

The electrical double-layer capacitor preferably includes an electrolytic solution and a separator along with the BDND electrode. Furthermore, the lithium ion capacitor includes an electrode, an electrolytic solution, and a separator, and preferably, a BDND electrode is used as a cathode, and a carbon material capable of storing lithium is used as an anode.

In the electrical double-layer capacitor according to an embodiment of the present invention, an aqueous electrolytic solution and a non-aqueous electrolytic solution can be used as the electrolytic solution, and an aqueous electrolytic solution excelling in voltage resistance characteristics is preferable. Examples of the aqueous electrolytic solution include aqueous solutions of acids such as hydrochloric acid, sulfuric acid, acetic acid, and phosphoric acid; aqueous solutions of bases such as sodium hydroxide and ammonia; and aqueous solutions of salts such as lithium perchlorate, magnesium perchlorate, calcium perchlorate, barium perchlorate, aluminum perchlorate, sodium perchlorate, magnesium sulfate, potassium sulfate, and sodium sulfate. Of the aqueous electrolytic solutions, use of an aqueous solution of a salt (in particular, an aqueous solution (saturated, for example) of a perchlorate such as sodium perchlorate) is preferable in that an aqueous electrical double-layer capacitor having a wider electrochemical window can be produced.

Furthermore, the aqueous electrolytic solution may contain one or more types each of additives and water soluble organic solvents in a range that does not depart from the spirit of the present invention. Examples of the additives include salts such as tetraethylammonium perchlorate. Examples of the water soluble organic solvents include polyhydric alcohols such as ethylene glycol, propylene glycol, butanediol, glycerin, and poly $C_{2-4}$ alkylene glycols (e.g. diethylene glycol, triethylene glycol, tetraethylene glycol); and lactones.

Examples of the non-aqueous electrolytic solution include organic electrolytic solutions such as propylene carbonate, γ-butyrolactone, and acetonitrile, including quaternary ammonium salts such as tetraethylammonium tetrafluoroborate and triethylmethylammonium tetrafluoroborate.

In the lithium ion capacitor, as the electrolytic solution, an organic electrolytic solution, in which a lithium salt such as $LiBF_4$ or $LiPF_6$ is dissolved in an organic solvent, can be used.

Examples of the separator include polyolefin-based separators such as PP and PE; and porous separators such as nonwoven fabrics and glass fibers.

The electrical double-layer capacitor according to an embodiment of the present invention can be charged and discharged by connecting a power supply between two BDND electrodes immersed in an electrolytic solution and applying a voltage. During charging, electrolyte ions are adsorbed to the BDND electrode surface. During discharging, cations and anions adsorbed on the BDND electrode surface desorb and diffuse back into the electrolytic solution. Because charging and discharging does not involve chemical changes in the BDND electrode, the long life of the BDND electrode can be maintained without degradation due to heat generated by the chemical reaction or the like.

Since the electricity storage device according to an embodiment of the present invention includes an electrode including a BDND having a large specific surface area, a large charge can be stored, and a large capacitance can be achieved. Furthermore, charging and discharging at higher speeds is possible compared to typical secondary batteries, and the charge-discharge cycle life is excellent. Therefore, the electricity storage device according to an embodiment of the present invention is useful as a backup power supply for a computer memory, a power storage system mounted in a railway vehicle, or an auxiliary power supply for a hybrid vehicle.

Sensor

A sensor according to an embodiment of the present invention includes an electrode containing the BDND described above (hereinafter, also referred to as a "BDND electrode"). The sensor provided with the BDND electrode according to an embodiment of the present invention preferably further includes, for example, a voltage control means for controlling the electric potential of the BDND electrode, and an electric current measuring means for measuring a change in a value of electric current flowing to the electrode.

Additionally, preferably, a voltage lead wire/electric current lead wire is connected to the BDND electrode, and the electric potential is controlled by the voltage control means.

Examples of the voltage control means include a potentiostat and a constant-potential power supply device.

Examples of the electric current measuring means include an ammeter and a galvanometer.

The BDND electrode is brought into contact, along with a counter electrode, with an electrolytic solution containing the sample to be analyzed, and the electric current value is measured while controlling the electric potential using the voltage control means. When a voltage is applied, an oxidation or reduction reaction occurs by electrolysis of the analyte on the BDND electrode, but because the electric current value associated with this reaction is correlated with the concentration of the sample, the concentration of the analyte can be calculated from the electric current value measured by the electric current measuring means.

As the counter electrode, platinum, carbon, stainless steel, gold, diamond, $SnO_2$, and the like can be used.

Since the sensor according to an embodiment of the present invention includes a BDND electrode having a wide electrochemical window and a small background current, trace signals that are hidden by noise in case of metal electrodes can also be analyzed, and thus the sensor according to an embodiment of the present invention can also be used for micro-measurements in fields such as environmental analysis, clinical testing, and food inspections, for example.

EXAMPLE(S)

Hereinafter, the present invention will be described more specifically with reference to examples, but the present invention is not limited by these examples.

Example 1 (BDND Fabrication)

Formation

First, a molded explosive attached with an electric detonator was placed inside a pressure-resistant vessel (iron vessel, volume: 15 m$^3$) for detonation, and the vessel was sealed. As the explosive, 0.50 kg of a mixture of TNT and RDX (TNT/RDX (mass ratio)=50/50) was used. Next, the electric detonator was ignited, and the explosive was detonated in the vessel. Subsequently, the vessel was left stand at the room temperature for 24 hours and thus lowering the temperature of the vessel and the contents. After this cooling, an ND crude product (including soot and aggregates of ND particles) was collected by scraping the ND crude product deposited on the inner wall of the vessel, with a spatula. The amount of the ND crude product collected was 0.025 kg.

Oxidation Treatment

Next, the ND crude product (3 g) produced in the formation process, concentrated sulfuric acid (80.6 g), and copper carbonate (catalyst amount) were loaded into a reactor, which was equipped with a condenser, while heating the reactor under 1 atm. In the condenser, a coolant at 50° C. was circulated, and an alkali trap connected to the condenser To this, fuming nitric acid (20.4 g, an amount at which the ratio of the concentrated sulfuric acid and nitric acid was 80/20 (former/latter; mass ratio)) was added dropwise. As the reaction proceeded, the evaporated nitric acid and the resulting $H_2O$ were condensed by the condenser and returned to inside the reactor. Meanwhile, NO, $NO_2$, CO, and $CO_2$ were collected in the alkali trap connected to the condenser. At this time, the reaction temperature was 150° C.

After 48 hours since the start of the reaction, heating of the reactor was stopped, and the inside of the reactor was cooled to room temperature. After cooling, the solid content (including ND aggregates) was washed with water by decantation. The initial supernatant liquid from the water washing was colored, and therefore the washing of the solid content with water by decantation was repeated until the supernatant liquid became visually clear.

Crushing

Next, 300 mL of a slurry produced in the previous process was subjected to crushing using a bead mill (trade name "Ultra Apex Mill UAM-015", available from Kotobuki Kogyou Co., Ltd.). In this process, zirconia beads (diameter 0.03 mm) were used as the crushing media, the amount of beads filled in the mill container was set to 60% relative to the volume of the mill container, and the circumferential speed of a rotor pin rotating inside the mill container was set to 10 m/s. In addition, the crushing treatment was performed for 90 minutes at a flow rate of the slurry circulating through the apparatus set at 10 L/h.

Centrifugation

Next, a classification operation that utilizes the action of centrifugal force was performed to remove coarse particles (centrifugation treatment) from the solution containing the ND that had been subjected to the crushing process described above. The centrifugal force in this centrifugation treatment was set to 20000×g, and the duration of the centrifugation was set to 10 minutes. Through this centrifugation treatment, a black transparent ND aqueous dispersion (1) was obtained.

Drying

Next, an evaporator was used to evaporate off the liquid content from the ND aqueous dispersion (1) produced in the centrifugation treatment, after which the residual solid content was heated and dried at 120° C. using a drying oven.

As described above, a ND (1) (powder, median diameter (particle size D50) of 5 nm measured by a dynamic light scattering method) was produced.

Boron Doping

Using the obtained ND (1) as a base material, the base material was doped with boron by the MPCVD method under the following conditions. A raw material solution was prepared by adding trimethoxyborane to an acetone/methanol mixed solution (9:1, v/v) as a carbon source at a ratio that makes the concentration of boron atoms with respect to carbon atoms to be 20000 ppm. This raw material was used, and thereby a BDND (1) was obtained.

<MPCVD Conditions>

Microwave power: 1300 W
Pressure: 50 Torr
Hydrogen gas flow rate: 400 sccm
Growth time: 8 h Heating Treatment The BDND (1) was subjected to a heating treatment at 425° C. for 8 hours in an air atmosphere, and a BDND (2) was produced.

Comparative Examples 1 to 3

Boron-doped diamond particles (BDDP (1) to (3)) were produced in the same manner as the BDND (1) of Example 1 with the exception that the base material was changed from ND (1) to diamond particles (DP (1) to (3)).

Measurement of Particle Size, Specific Surface Area, and Electrical Conductivity The particle size (median diameter: D50) of the resulting BDND (1) and (2) and BDDP (1) to (3) was measured by dynamic light scattering. FIG. 1 shows particle size measurement results for the BDND (1) and (2).

The BET specific surface area was measured by a nitrogen adsorption method.

In addition, a glass capillary having an inner diameter of 1 mm was filled with the BDND (1) at 20° C., and the electrical conductivity was determined from the DC resistance at both ends.

The results are summarized and shown in the table below.

TABLE 1

Table 1

| | | Base Material Particle Size (nm) | Particle size (nm) After Boron Doping | Specific Surface Area (m²/g) | Electrical Conductivity (S/cm) |
|---|---|---|---|---|---|
| Example 1 | BDND (1) | 5 | 111 | 182.0 | 0.100 |
| | BDND (2) | 5 | 119 | 658.0 | 0.0301 |
| Comparative Example 1 | BDDP (1) | 2500 | 3558 | 3.223 | — |
| Comparative Example 2 | BDDP (2) | 300 | 366 | 57.90 | — |
| Comparative Example 3 | BDDP (3) | 100 | 147 | 106.3 | — |

From Table 1, it was confirmed that the BDND (1) and (2) excelled in electrical conductivity, and that the specific surface area was greater than that of the BDDP.

Figure 2:
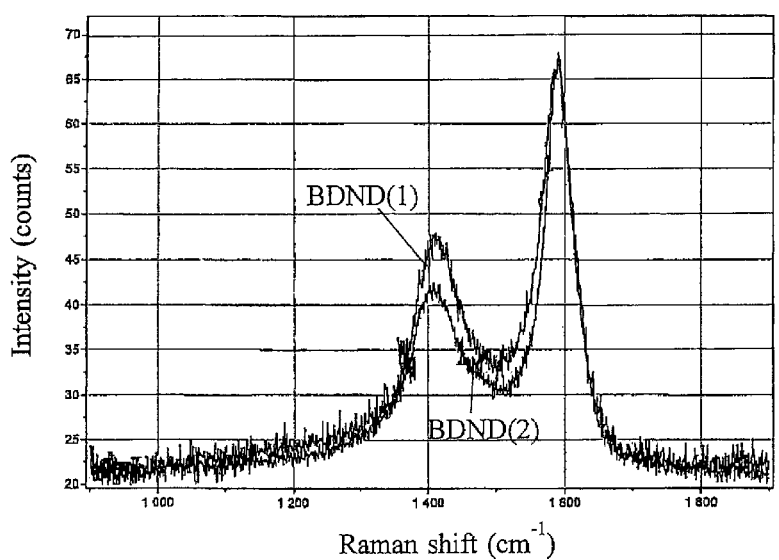
FIG. 2 shows UV Raman spectral data of the BDND (1) and (2) produced in the examples.
Figure 3:
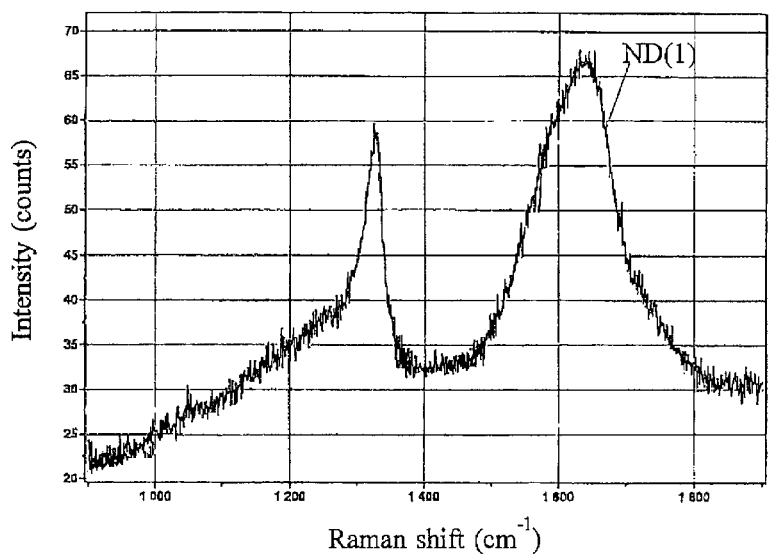
FIG. 3 shows UV Raman spectral data of an ND (1) used in the examples.

Additionally, from UV Raman spectrum (light source wavelength: 325 nm) measurement results for the ND (1) and the BDND (1) and (2), a D-band and a G-band originating from $sp^2$ carbon were notably observed (FIGS. 2, 3).

Furthermore, a diffraction pattern of diamond crystals was observed by X-ray diffraction of the BDND (2), and it was confirmed that the BDND (2) included diamonds.

Figure 4:
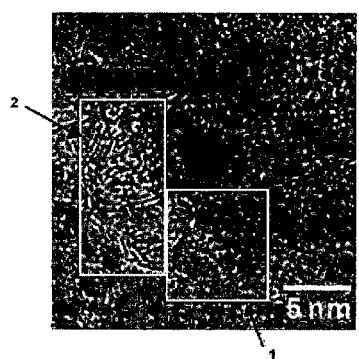
FIG. 4 shows TEM observation image of the BDND (2) produced in the examples. In the image, the arrow 1 indicates a diamond lattice surface, and the arrow 2 indicates a graphite-like layered structure.

Furthermore, from the results of TEM observation of the BDND (2), a graphite layered structure was observed in addition to a diamond lattice surface (FIG. 4).

Furthermore, elemental analysis of BDND (2) was performed by an ICP-AES method, and as a result, it was found that the BDND (2) includes boron at an amount of 620 mg/kg.

The above results suggested that the BDND according to an embodiment of the present invention is a composite having a structure in which an $sp^2$ carbon layer containing boron is deposited on the surface of the nanodiamond particles.

Example 2 (Electrode Fabrication)

BDND ink was prepared by dispersing 10 mg of the produced BDND (1) in 0.5 mL 30 mass % ethanol.

20 μL of the BDND ink was cast onto a glassy carbon electrode serving as a current collector and dried, after which 10 μl of 5 mass % Nafion (a perfluorocarbon having a configuration in which a perfluoro side chain with a sulfonic acid group is bonded to a hydrophobic Teflon (trade name) backbone) was cast and coated onto the outermost surface, and thereby a BDND electrode (1) was obtained.

Example 3 (Electrode Fabrication)

A BDND electrode (2) was obtained in the same manner as in Example 2 with the exception that the BDND (2) was used in place of the BDND (1).

Comparative Example 4 (Electrode Fabrication)

A BDDP electrode (1) was obtained in the same manner as in Example 2 with the exception that the BDDP (1) was used in place of the BDND (1).

Comparative Example 5 (Electrode Fabrication)

A BDDP electrode (2) was obtained in the same manner as in Example 2 with the exception that the BDDP (2) was used in place of the BDND (1).

Comparative Example 6 (Electrode Fabrication)

A BDDP electrode (3) was obtained in the same manner as in Example 2 with the exception that the BDDP (3) was used in place of the BDND (1).

Comparative Example 7 (Electrode Fabrication)

An activated carbon (AC) electrode was obtained in the same manner as in Example 2 with the exception that activated carbon (specific surface area: 1318 $m^2/g$) was used in place of the BDND (1). In this case, because the electrical conductivity of the AC was low, acetylene black (AB) was added as a conductivity promoter with the ratio of AC:AB (mass ratio) set to 8:1.

Evaluation

The performance of the electrodes obtained in the examples and comparative examples was evaluated.

[1] Electrochemical Window and Cell Voltage Measurements (1-1) The cyclic voltammetry (CV) was measured for the BDND electrode (2) and the AC electrode in 1M $H_2SO_4$ (scan speed: 10 mV/s). Measurements were performed with a three-electrode system using a platinum wire as the counter electrode and an Ag/AgCl electrode as the reference electrode.

Figure 5:
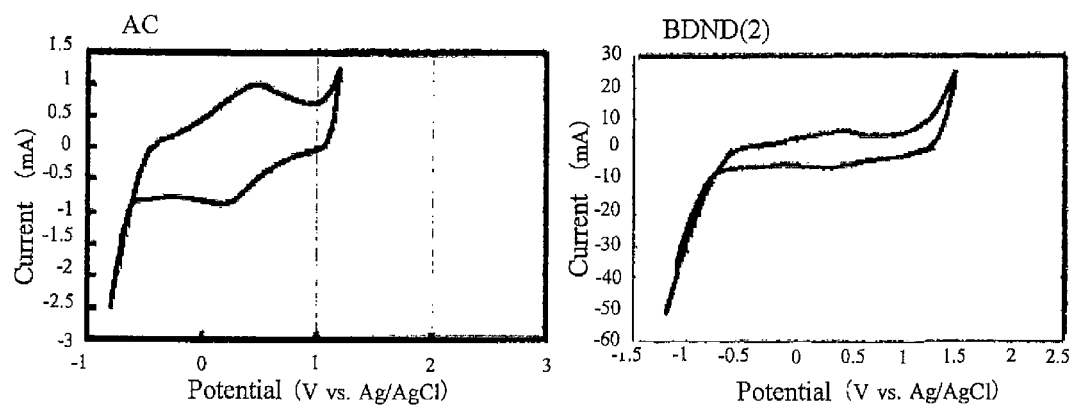
FIG. 5 shows the results of cyclic voltammetry (CV) measurements (scan speed: 10 mV/s) in 1M $H_2SO_4$ for a three-electrode system that uses the BDND electrode (2) or activated carbon (AC) electrode.

The electrochemical window was approximately 1.5 V for the AC electrode, whereas the electric potential window of the BDND electrode (2) was found to be wide at 1.9 V (FIG. 5).

(1-2) An excess amount of sodium perchlorate ($NaClO_4$) was added to 100 mL of ultrapure water, after which the excess portion of sodium perchlorate was removed by suction filtration, and thereby a saturated $NaClO_4$ aqueous solution was obtained. The CV (scan speed: 10 mV/s) in the saturated $NaClO_4$ aqueous solution was measured for the BDND electrode (2). Measurements were performed with a three-electrode system using a platinum wire as the counter electrode and an Ag/AgCl electrode as the reference electrode.

Figure 6:
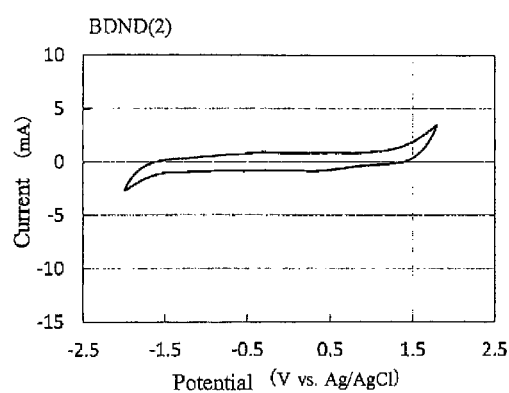
FIG. 6 shows the results of CV measurements (scan speed: 10 mV/s) of a three-electrode system that uses the BDND electrode (2), the measurements being performed in a saturated $NaClO_4$ aqueous solution.

It was found that the electrochemical window was 3.1 V, and that the electrochemical window was widened by using an aqueous perchlorate solution (FIG. 6).

Figure 7:
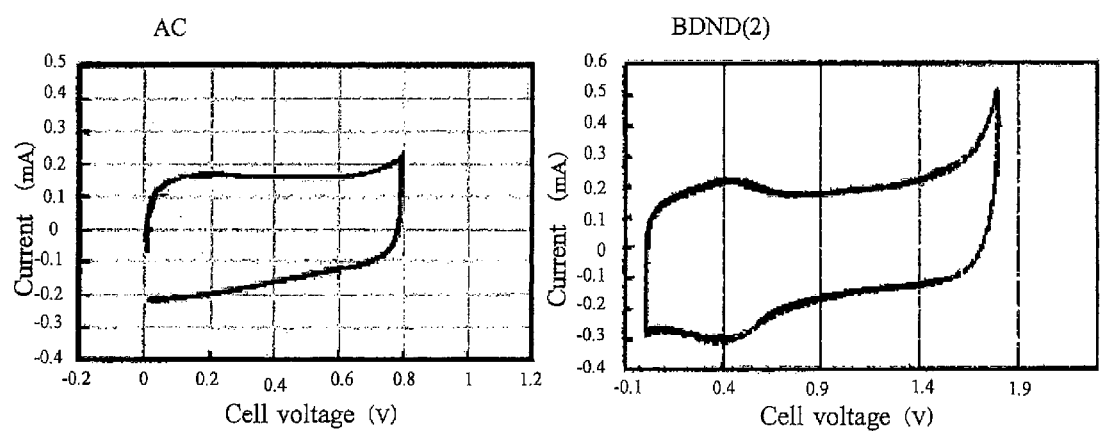
FIG. 7 shows the results of CV measurements (scan speed: 10 mV/s) of a symmetric two-electrode cell that uses the BDND electrode (2) or an AC electrode, the measurements being performed in 1M $H_2SO_4$.

(1-3) When CV measurements were performed on a symmetric two-electrode cell that used the BDND electrodes (2) or AC electrodes in 1 M $H_2SO_4$ (cyclic voltammetry, scan speed: 10 mV/s), electrolysis of solvent (water) began when the cell voltage (potential difference between both electrodes) of the AC electrodes was 0.8 V or greater, whereas with the BDND electrodes (2), it was found that the voltage could be applied up to 1.8 V (FIG. 7). When CV measurements were similarly performed with the BDDP electrodes (3), electrolysis of the solvent (water) began to occur when the cell voltage (potential difference between both electrodes) was 1.6 V or higher.

Figure 8:
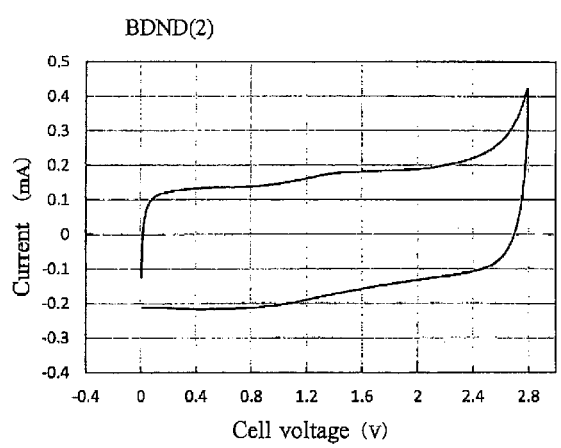
FIG. 8 shows the results of CV measurements (scan speed: 10 mV/s) of a symmetric two-electrode cell that uses the BDND electrode (2), the measurements being performed in a saturated $NaClO_4$ aqueous solution.

(1-4) When CV measurements were performed with a symmetric two-electrode cell that used the BDND electrodes (2) in a saturated $NaClO_4$ aqueous solution (scan speed: 10 mV/s), it was found that, with the BDND electrodes (2), a voltage up to 2.8 V (2) can be applied (FIG. 8). In addition, when a voltage of 2.8 V or higher was applied, electrolysis of the solvent (water) began to occur.

Therefore, the results suggested that the BDND (2), with which a large cell voltage can be applied in an aqueous solution, is an electrode material that is suited for achieving a high energy density water-based EDLC.

The results also suggest that a saturated $NaClO_4$ aqueous solution, in which a large cell voltage can be employed in an aqueous solution, is a suitable electrolyte for achieving a high energy density water-based EDLC.

Note that the electrostatic energy that can be stored in an EDLC is expressed by $CV^2/2$ (C: electrical double-layer capacitance, V: cell voltage).

[2] CV at Different Scan Speeds (2-1) Using various scan speeds, the CV (in 1M $H_2SO_4$, symmetric two-electrode cell) of the BDND electrode (1), the BDND electrode (2), or the AC electrode was measured. From the results, it was found that the BDND electrode (1) and the BDND electrode (2) exhibited excellent response with little distortion in the cyclic voltammogram trace, even at a relatively fast scan speed of 1000 mV/s.

Figure 9:
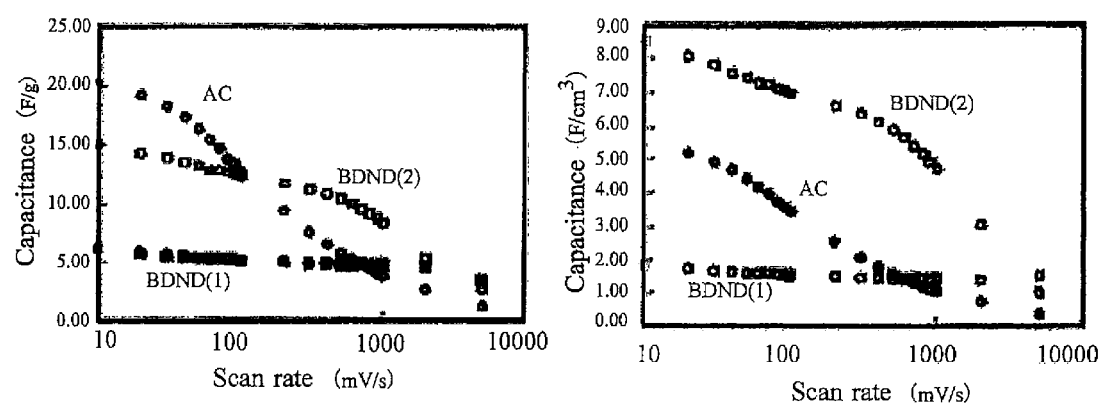
FIG. 9 shows plots of calculated electrical double-layer capacitances at scan speeds from 10 to 10000 mV/s in 1M $H_2SO_4$ against the scan speed for a symmetric two-electrode cell that uses the BDND electrode (1), the BDND (2), or an AC electrode.

Thus, the electrical double-layer capacitance at each scan speed was calculated and plotted with respect to the scan speed (FIG. 9). When the capacity per mass of the electrode active material (BDND (1), (2) or AC) was compared, it was found that while the capacity with the AC electrode was greater at low scanning speed of 100 mV/s or lower, the capacities of the BDND electrodes (1) and (2) were greater at high scanning speed of 100 mV/s or greater.

The reason for the results may be surmised as follows: the AC has micro-holes that are well-developed within the particles, and is an electrode material, whose large specific surface area yields a large electrical double-layer capacitance. However, the electrolyte ions inside the micro-holes can not move freely, and therefore adsorption to and desorption of the electrolyte ions from the surface cannot respond to the changes in electric potential during high speed scanning, resulting in the capacity decrease. On the other hand, the micro-holes do not exist in the BDND (1) and (2), and therefore this type of significant decrease in capacity did not occur in case of the BDND (1) and (2).

(2-2) Using various scan speeds, the CV (in a saturated sodium perchlorate aqueous solution, symmetric two-electrode cell) of the BDND electrode (2) or the AC electrode was measured. From the results, it was found that the BDND electrode (1) and the BDND electrode (2) exhibited excellent response with little distortion in the cyclic voltammogram trace, even at a relatively fast scan speed of 1000 mV/s. Meanwhile, at a fast scan speed, the AC electrode exhibited large distortion in the cyclic voltammogram trace, and thus it was clear that the AC electrode had a poor response in rapid charging and discharging.

Figure 10:
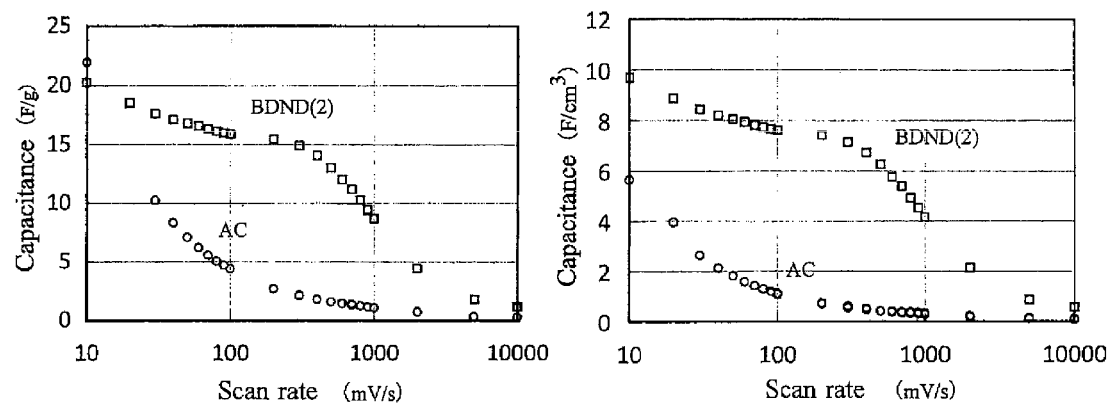
FIG. 10 shows plots of calculated electrical double-layer capacitances at scan speeds from 10 to 10000 mV/s in a saturated $NaClO_4$ aqueous solution against the scan speed for a symmetric two-electrode cell that uses a BDND (2) or AC electrode.

The electrical double-layer capacitance at each scan speed was calculated and plotted with respect to the scan speed (FIG. 10). When the capacity per mass of the electrode active material was compared, it was found that the capacity of the BDND electrode (2) was greater at high scanning speed of 20 mV/s or greater.

Thus, with the BDND (1) and (2), the capacity did not readily decrease even during high speed scanning, and from that feature, it is thought that the BDND (1) and (2) were electrode materials that were suited for the fabrication of high output EDLC.

The results of the electrical double-layer capacitance at various scan speeds were used to calculate the energy density. For both the BDND electrode (2) and the AC electrode, the energy density was calculated at the cell voltage (V) of 2.8 V. Similar to the graph of the electrical double-layer capacitance, it was found that during scanning at a high speed scan speed (20 mV/s or greater), the BDND electrode (2) exhibited a larger energy density than the AC electrode.

Moreover, when the capacity was expressed in terms of per volume of the active material layer of the electrode, it was found that the BDND electrodes (1) and (2) exhibited a greater capacity than the AC electrode in a range from 10 to 1000 mV/s. It is thought that the reason for this is that the AC had micro-holes, and therefore AC was a material with a small bulk density, whereas the BDND (1) and (2) did not have micro-holes, and had a greater bulk density compared to AC.

Accordingly, it is thought that the BDND (1) and (2) are useful for the fabrication of space-saving EDLC devices.

Regarding the electrodes obtained in Examples 2 and 3 and Comparative Examples 4 to 6, the relationships between the particle size and specific surface area of the conductive particles (BDND or BDDP) that were used, and the electrical double-layer capacitance (scan speed: 10 mV/s) of the obtained electrode are shown in the following table. From the table below, it was found that the electrodes according to embodiments of the present invention exhibited large electrical double-layer capacitance (or capacitance) because they included BDND with a large specific surface area.

TABLE 2

Table 2

| | | Conductive Particles Included in the Electrode | | Electrical Double-layer |
|---|---|---|---|---|
| | | Particle Size (nm) | Specific Surface Area (m$^2$/g) | Capacitance (F/g) |
| Example 2 | BDND Electrode (1) | 111 | 182.0 | 6.22 |
| Example 3 | BDND Electrode (2) | 119 | 658.0 | 151 |
| Comparative Example 4 | BDDP Electrode (1) | 3558 | 3.223 | 0.343 |
| Comparative Example 5 | BDDP Electrode (2) | 366 | 57.90 | 1.26 |
| Comparative Example 6 | BDDP Electrode (3) | 147 | 106.3 | 2.90 |

Figure 11:
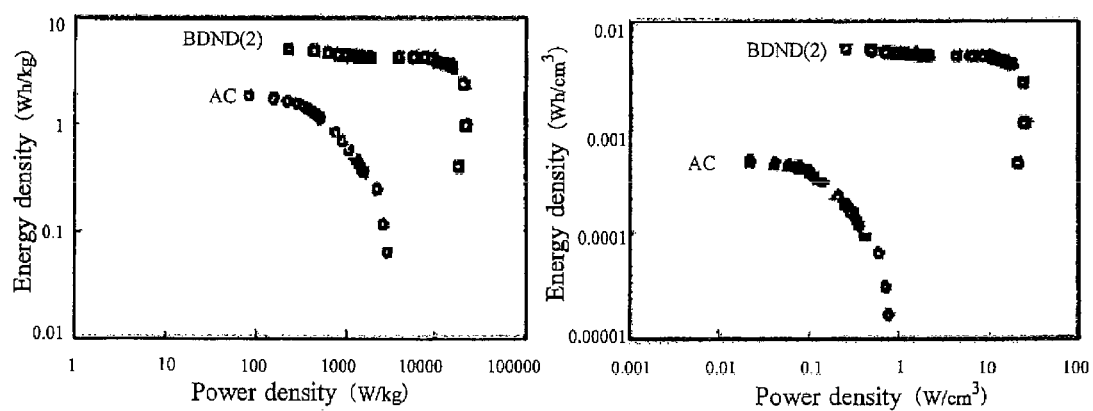
FIG. 11 shows plots of the energy density versus the output density in 1M $H_2SO_4$ for a symmetric two-electrode cell using the BDND (2) and AC electrodes.

FIG. 11 is Ragone plots (energy density-output density plot) for symmetric two-electrode cells that use BDND electrodes (2) or AC electrodes. From the results, it was found that, using the BDND electrode (2), a water-based EDLC device with a higher energy density and a higher output density than the AC electrode can be prepared. In particular, with regard to performance per volume, the use of the BDND electrode (2) can increase the output density while maintaining a high energy density, and therefore it is thought that the BDND electrode (2) is useful for fabricating compact, high-output devices.

Figure 12:
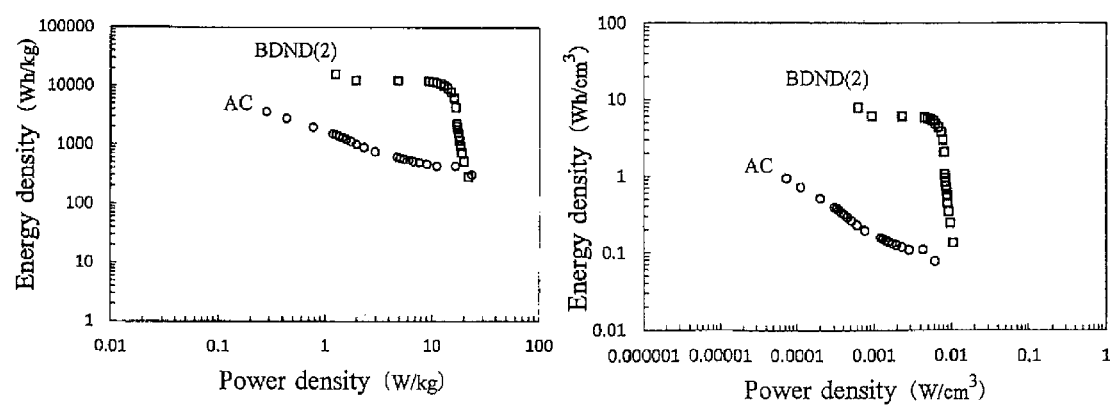
FIG. 12 shows plots of the energy density versus the output density in a saturated aqueous $NaClO_4$ aqueous solution is plotted for a symmetric two-electrode cell using the BDND (2) and the AC electrodes.

From FIG. 12, which is Ragone plots of symmetric two-electrode cells that used the BDND electrodes (2) or the AC electrodes, it was confirmed that, when the BDND electrode (2) was used in a saturated NaClO$_4$ aqueous solution, the energy density improved in accordance with the increase in the cell voltage while maintaining the output density, compared to the BDND electrode (2) in 1M H$_2$SO$_4$. Therefore, it was confirmed that the BDND electrode (2) in the saturated NaClO$_4$ aqueous solution exhibited higher performance compared to the BDND electrode (2) in 1M H$_2$SO$_4$.

To summarize the above, configurations according to an embodiment of the present invention and variations thereof will be described below.

[1] A boron-doped nanodiamond having a specific surface area of 110 m$^2$/g or greater, and electrical conductivity at 20° C. of $5.0 \times 10^{-3}$ S/cm or greater.

[2] The boron-doped nanodiamond according to [1], wherein a median diameter is 200 nm or smaller.

[3] The boron-doped nanodiamond according to [1] or [2], wherein a boron content amount is from 0.1 to 100 mg/g.

[4] The boron-doped nanodiamond according to any one of [1] to [3], having bands at from 1370 to 1420 cm$^{-1}$ and from 1580 to 1620 cm$^{-1}$ in a Raman spectrum with a light source wavelength of 325 nm.

[5] A method for manufacturing a boron-doped nanodiamond, the method including depositing a boron-containing diamond layer and/or carbon layer by a chemical vapor deposition method (preferably a microwave plasma CVD method) onto the surface of nanodiamond particles to produce a boron-doped nanodiamond as described in any one of [1] to [4].

[6] An electrode containing the boron-doped nanodiamond described in any one of [1] to [4].

[7] The electrode according to [6], wherein the electrical double-layer capacitance per mass is 3 F/g or greater.

[8] A sensor provided with the electrode described in [6] or [7].

[9] An electricity storage device including the electrode described in [6] or [7].

[10] The electricity storage device according to [9], which is an electrical double-layer capacitor.

[11] The electricity storage device according to [9], which is a water-based electrical double-layer capacitor using a saturated aqueous solution of a perchlorate as an electrolytic solution.

[12] The electricity storage device according to [9], which is a lithium ion capacitor.

[13] A power supply including the electricity storage device described in any one of [9] to [12].

INDUSTRIAL APPLICABILITY

The BDND according to an embodiment of the present invention exhibits high physical stability and chemical stability originating from the diamond, and also has excellent conductivity and a large specific surface area. Therefore, in a case where the BDND according to an embodiment of the present invention is used, an electrode with large capacitance can be obtained.

In addition, the electrode containing the BDND according to an embodiment of the present invention exhibits high sensitivity, has a large electrical double-layer capacitance per mass, and has a wide electrochemical window. Therefore, the electrode is useful as an electrode for an electrochemical sensor or an electricity storage device.

The invention claimed is:

1. An ink comprising boron-doped nanodiamond particles having a specific surface area of 110 $m^2/g$ or greater, and electrical conductivity at 20° C. of $5.0 \times 10^{-3}$ S/cm or greater.

2. The ink according to claim 1, wherein a median diameter of the boron-doped nanodiamond particles is 200 nm or smaller.

3. The ink according to claim 1, wherein the boron-doped nanodiamond particles have bands at from 1370 to 1420 $cm^{-1}$ and from 1580 to 1620 $cm^{-1}$ in a Raman spectrum with a light source wavelength of 325 nm.

4. The ink according to claim 1, wherein the boron-doped nanodiamond particles are manufactured by a method including depositing a boron-containing diamond layer and/or carbon layer onto the surface of nanodiamond particles using a microwave plasma CVD method with film forming materials,
wherein the film forming materials comprise a boron source and a carbon source, and a concentration of the boron source to the carbon source included in the film forming material is from 10000 to 30000 ppm.

5. An electrode prepared from the ink of claim 1.

6. The electrode according to claim 5, wherein an electrical double-layer capacitance per mass is 3 F/g or greater.

7. A sensor comprising the electrode described in claim 5.

8. An electricity storage device comprising the electrode described in claim 5.

9. A lithium ion capacitor comprising an electrode described in claim 5.

10. Boron-doped nanodiamond particles having a specific surface area of 110 $m^2/g$ or greater, electrical conductivity at 20° C. of $5.0 \times 10^{-3}$ S/cm or greater, and a median diameter of 200 nm or smaller.

11. The boron-doped nanodiamond particles according to claim 10, having bands at from 1370 to 1420 $cm^{-1}$ and from 1580 to 1620 $cm^{-1}$ in a Raman spectrum with a light source wavelength of 325 nm.

12. The boron-doped nanodiamond particles according to claim 10, wherein a content of boron is from 0.1 to 100 mg/g.

13. The boron-doped nanodiamond particles according to claim 10, comprising a boron-containing diamond layer and/or a boron-containing carbon layer on a surface of nanodiamond particles.

14. A lithium ion capacitor comprising an electrode including the boron-doped nanodiamond particles described in claim 10.

15. An electrode comprising the boron-doped nanodiamond particles described in claim 10.

16. The electrode according to claim 15, wherein an electrical double-layer capacitance per mass is 3 F/g or greater.

17. The electrode according to claim 15, wherein the boron-doped nanodiamond particles are coated on a base member.

18. The electrode according to claim 17, wherein the base member comprises an insulating substrate or a conductive substrate.

19. The electrode according to claim 17, wherein the base member comprises a silicon substrate, a glass substrate, a quartz substrate, a ceramic substrate, or a diamond substrate.

20. The electrode according to claim 17, wherein the base member comprises a metal substrate or a carbon material substrate.

21. The electrode according to claim 17, wherein the boron-doped nanodiamond particles are fixed to the base member with a binder.

22. The electrode according to claim 21, wherein the binder comprises a perfluorocarbon.

23. A sensor comprising the electrode described in claim 15.

24. An electricity storage device comprising the electrode described in claim 15.

25. A method for manufacturing boron-doped nanodiamond particles, the method including depositing a boron-containing diamond layer and/or carbon layer onto the surface of the nanodiamond particles using a microwave plasma CVD method to produce boron-doped nanodiamond particles having a specific surface area of 110 $m^2/g$ or greater, electrical conductivity at 20° C. of $5.0 \times 10^{-3}$ S/cm or greater, and a median diameter of 200 nm or smaller.

* * * * *